(12) United States Patent
Shindo

(10) Patent No.: US 10,174,808 B2
(45) Date of Patent: Jan. 8, 2019

(54) V-RIBBED BELT AND METHOD FOR MANUFACTURING SAME

(71) Applicant: BANDO CHEMICAL INDUSTRIES, LTD., Kobe-shi (JP)

(72) Inventor: Yuya Shindo, Kobe (JP)

(73) Assignee: Bando Chemical Industries, Ltd., Kobe-shi, Hyogo (JP)

( * ) Notice: Subject to any disclaimer, the term of this patent is extended or adjusted under 35 U.S.C. 154(b) by 0 days.

(21) Appl. No.: 15/916,092

(22) Filed: Mar. 8, 2018

(65) Prior Publication Data

US 2018/0195579 A1 Jul. 12, 2018

Related U.S. Application Data

(63) Continuation of application No. PCT/JP2016/004451, filed on Oct. 3, 2016.

(51) Int. Cl.
*F16G 5/20* (2006.01)
*B29D 29/10* (2006.01)
(Continued)

(52) U.S. Cl.
CPC .............. *F16G 5/20* (2013.01); *B29D 29/103* (2013.01); *B32B 3/30* (2013.01); *B32B 25/042* (2013.01); *D01F 6/62* (2013.01); *D02G 3/02* (2013.01); *D02G 3/28* (2013.01); *D02G 3/447* (2013.01); *F16G 5/08* (2013.01); *B32B 2260/021* (2013.01); *B32B 2260/048* (2013.01); *B32B 2307/546* (2013.01); *B32B 2413/00* (2013.01);
(Continued)

(58) Field of Classification Search
CPC ......... F16G 5/20; F16G 5/08; D10B 2505/02; D10B 2331/04; B32B 3/30; B32B 25/042; B32B 2307/546; B32B 2260/021; B32B 2260/048; B32B 2413/00; B29D 29/103; D01F 6/62; D02G 3/02; D02G 3/28; D02G 3/447
USPC ........................................................ 474/238
See application file for complete search history.

(56) References Cited

U.S. PATENT DOCUMENTS

| 2011/0017378 A1* | 1/2011 | Shimada ............... B60C 9/0042 152/527 |
| 2012/0115658 A1* | 5/2012 | Kanzow ................. D02G 3/447 474/238 |

(Continued)

FOREIGN PATENT DOCUMENTS

| DE | 112013002719 T5 | 2/2015 |
| JP | 11-6546 A | 1/1999 |

(Continued)

*Primary Examiner* — Henry Y Liu
*Assistant Examiner* — Robert T Reese
(74) *Attorney, Agent, or Firm* — Knobbe, Martens, Olson & Bear, LLP

(57) ABSTRACT

A V-ribbed belt has a cord made of polyester-based fibers, the total fiber fineness of which is 2200 dtex or more and 5500 dtex or less. A fiber fineness of the cord per belt width corresponding to a single V-shaped rib ranges from 10000 dtex to 19000 dtex. A belt dry-heat shrinkage force per belt width corresponding to a single V-shaped rib is 44 N or more. The belt dry-heat shrinkage force is a load increase with respect to a belt length of 300 mm in 30 minutes after applying, in an atmosphere of 150° C., a load of 6N in the belt longitudinal direction and holding the belt.

9 Claims, 7 Drawing Sheets

(51) Int. Cl.
*B32B 3/30* (2006.01)
*B32B 25/04* (2006.01)
*D01F 6/62* (2006.01)
*D02G 3/02* (2006.01)
*D02G 3/28* (2006.01)
*D02G 3/44* (2006.01)
*F16G 5/08* (2006.01)

(52) U.S. Cl.
CPC ...... *D10B 2331/04* (2013.01); *D10B 2505/02* (2013.01)

(56) References Cited

U.S. PATENT DOCUMENTS

| | | | | |
|---|---|---|---|---|
| 2012/0231252 | A1* | 9/2012 | Arakawa | B32B 5/024 428/219 |
| 2014/0073468 | A1* | 3/2014 | Knutson | F16G 5/08 474/260 |
| 2014/0235393 | A1* | 8/2014 | Sakanaka | F16G 5/166 474/263 |
| 2014/0290387 | A1 | 10/2014 | Shingai | |
| 2016/0040749 | A1* | 2/2016 | Kageyama | B32B 25/10 474/8 |
| 2017/0037933 | A1* | 2/2017 | Takami | D06M 15/41 |
| 2017/0045116 | A1* | 2/2017 | Kobayashi | F16G 1/08 |
| 2017/0058996 | A1* | 3/2017 | Kim | B29D 29/08 |

FOREIGN PATENT DOCUMENTS

| | | |
|---|---|---|
| JP | 2005-076703 A | 3/2005 |
| JP | 2005-076705 A | 3/2005 |
| JP | 2013-127278 A | 6/2013 |
| JP | 2014-9749 A | 1/2014 |
| JP | 5750561 B1 | 5/2015 |

\* cited by examiner

V-RIBBED BELT AND METHOD FOR MANUFACTURING SAME

CROSS-REFERENCE TO RELATED APPLICATIONS

This is a continuation of International Application No. PCT/JP2016/004451 filed on Oct. 3, 2016 which claims priority to Japanese Patent Application No. 2015-201301 filed on Oct. 9, 2015. The entire disclosures of these applications are incorporated by reference herein.

BACKGROUND

The present invention relates to a V-ribbed belt and a method for forming the V-ribbed belt.

A power transmission belt having a cord made of polyester-based fibers is buried therein has been known. For example, Japanese Unexamined Patent Publication No. 2005-076703 discloses a V-ribbed belt with a cord buried therein which is made of polybutylene terephthalate fibers with a total fiber fineness of between 4000 dtex and 12000 dtex. Japanese Unexamined Patent Publication No. 2005-076705 discloses a V-ribbed belt with a cord buried therein which is made of polyethylene terephthalate fibers. The fiber fineness of the buried fibers per belt width of 1 mm is between 2000 dtex/mm and 5000 dtex/mm.

SUMMARY

The present invention is directed to a V-ribbed belt which includes: a V-ribbed belt body made of rubber and provided with a plurality of V-shaped ribs extending in a belt longitudinal direction and arranged parallel to one another in a belt width direction; and a cord buried in the V-ribbed belt body such that the cord forms a helical pattern having a pitch in the belt width direction. The cord is made of a plied yarn with a total fiber fineness ranging from 2200 dtex to 5500 dtex, the plied yarn being formed by preparing a plurality of first-twist yarns, each obtained by twisting a bundle of polyester-based fibers in one direction, and secondly twisting the plurality of first-twist yarns in a direction opposite to a first-twist direction. A fiber fineness of the cord per belt width corresponding to a single V-shaped rib ranges from 10000 dtex to 19000 dtex. A belt dry-heat shrinkage force per belt width corresponding to a single V-shaped rib is 44 N or more. The belt dry-heat shrinkage force is a load increase with respect to a belt length of 300 mm in 30 minutes after applying, in an atmosphere of 150° C., a load of 6N in the belt longitudinal direction and holding the belt.

The present invention is a belt transmission system in which the above V-ribbed belt of the present invention is looped around a plurality of pulleys.

The present invention is directed to a method for forming the above V-ribbed belt of the present invention, wherein the cord undergoes, during an adhesion treatment in which the cord is soaked in an adhesive agent and heated, a stretching and thermal fixation process in which the cord is stretched while tension is applied to the cord, and a degree of stretching in the stretching and thermal fixation process is greater than 6.0%.

DETAILED DESCRIPTION

Embodiments will be described in detail below, based on the drawings.

(V-Ribbed Belt B)

Figure 1:
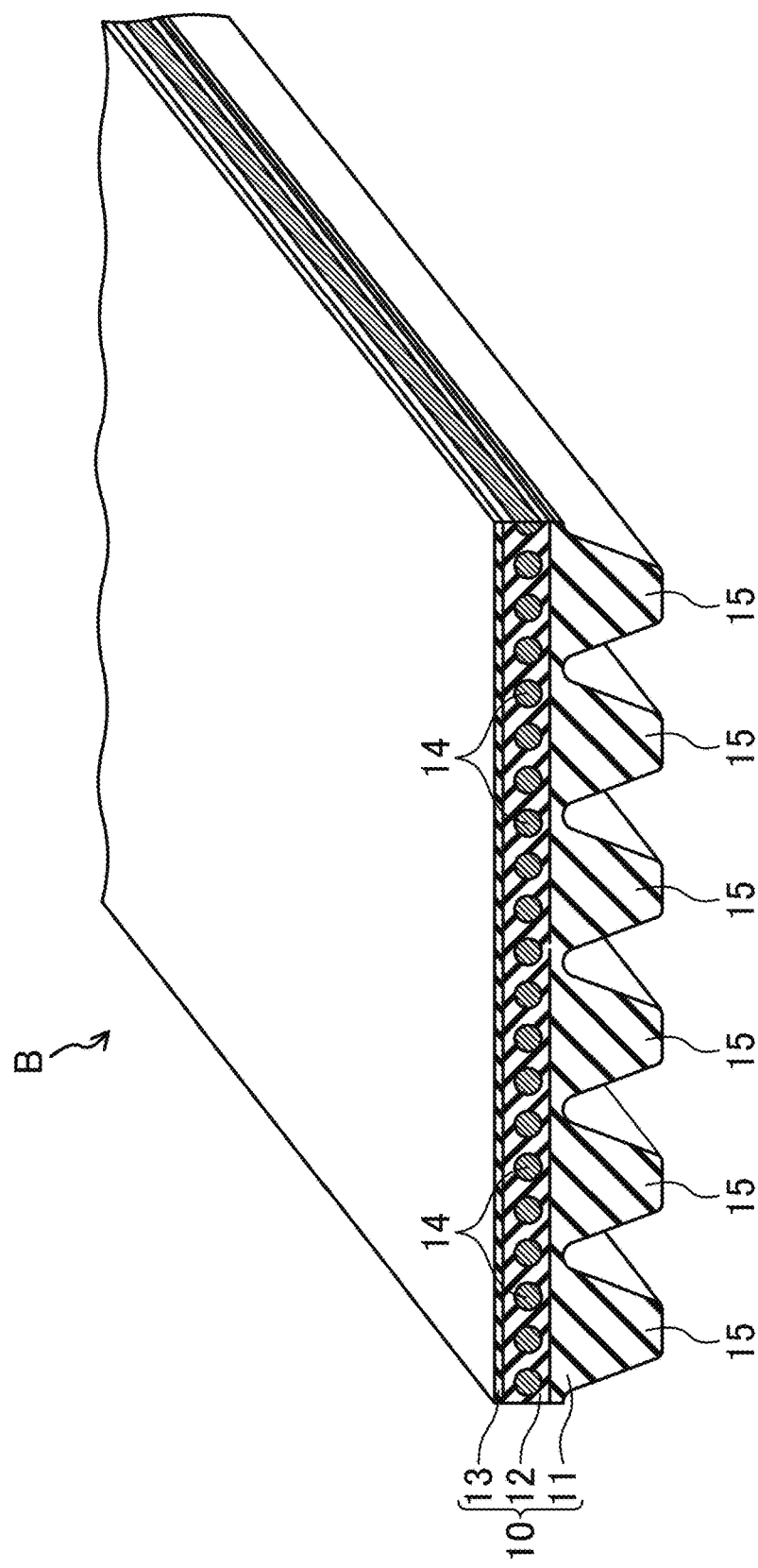
FIG. 1 illustrates a perspective view of a V-ribbed belt according to an embodiment.
Figure 2:
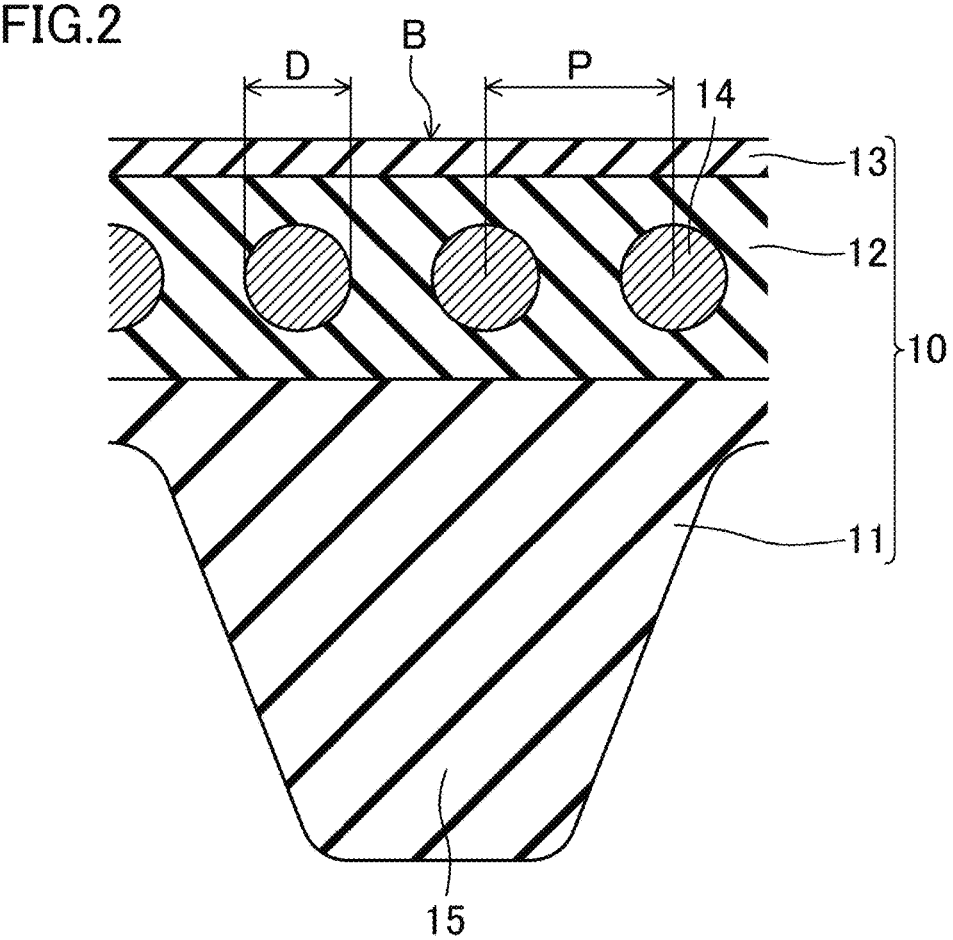
FIG. 2 illustrates a cross-sectional view of a single V-shaped rib of the V-ribbed belt according to the embodiment.

FIGS. 1 and 2 illustrate a V-ribbed belt B of an embodiment. The V-ribbed belt B of the embodiment is, for example, an endless belt used in a belt transmission system for driving an accessory provided in an engine compartment of an automobile. The V-ribbed belt B of the embodiment has a length ranging from 700 mm to 3000 mm, a width ranging from 10 mm to 36 mm, and a maximum thickness ranging from 4.0 mm to 5.0 mm, for example.

The V-ribbed belt B of the embodiment has a three-layered, rubber-made V-ribbed belt body 10 which includes a compressed rubber layer 11 constituting a pulley contacting portion of an inner side of the belt, an intermediate adhesive rubber layer 12, and a backface rubber layer 13 constituting an outer side of the belt. A cord 14 is embedded in a middle portion, in the belt thickness direction, of the adhesive rubber layer 12 of the V-ribbed belt body 10, such that the cord 14 forms a helical pattern having a pitch in the belt width direction. Note that the compressed rubber layer 11 and the adhesive rubber layer 12 may form the V-ribbed belt body 10, and the backface rubber layer 13 may be replaced with a reinforcing fabric.

The compressed rubber layer 11 includes a plurality of V-shaped ribs 15 protruding from the inner side of the belt. The maximum thickness of the compressed rubber layer 11 is between 3.5 mm and 5.0 mm, for example. The plurality of V-shaped ribs 15 are each in the shape of a rib extending in the longitudinal direction of the belt and having an approximately inverted triangular cross-section. The V-shaped ribs 15 are arranged parallel to one another in the belt width direction. The height of the V-shaped ribs 15 is between 2.0 mm and 3.0 mm. The width of a single V-shaped rib 15 in the belt width direction is typically 3.56 mm. The number of the V-shaped ribs 15 is three or more and six or less (six ribs in FIG. 1), for example.

The adhesive rubber layer 12 is in the shape of a strip having a horizontally elongated rectangular cross-section, and has a thickness ranging from 1.0 mm to 2.5 mm, for example. The backface rubber layer 13 is in the shape of a strip having a horizontally elongated rectangular cross-section, and has a thickness ranging from 0.4 mm to 0.8 mm, for example. Suitably, a surface of the backface rubber layer 13 has a weave pattern transferred from woven fabric in order to reduce sounds generated between the belt back surface and a flat pulley in contact with the belt back surface.

The compressed rubber layer 11, the adhesive rubber layer 12, and the backface rubber layer 13 are made of a rubber composition produced from an uncrosslinked rubber composition prepared by kneading a rubber component with various compound ingredients mixed therein. This uncrosslinked rubber composition is heated and pressed, so that the rubber component is crosslinked by a crosslinker. The rubber composition may be crosslinked by using sulfur as the crosslinker, or may be crosslinked by using an organic peroxide as the crosslinker. The rubber compositions that make the compressed rubber layer 11, the adhesive rubber layer 12, and the backface rubber layer 13 may be different from each other or the same as each other. In order to reduce sticking between the belt back surface and the flat pulley in contact with the belt back surface, the backface rubber layer 13 is suitably made of a rubber composition which is slightly harder than the rubber composition of the adhesion rubber layer 12.

Examples of the rubber component of the rubber composition that makes the compressed rubber layer 11, the adhesive rubber layer 12, and the backface rubber layer 13 include ethylene-α-olefin elastomer (such as EPDM and EPR), chloroprene rubber (CR), chlorosulfonated polyethylene rubber (CSM), and hydrogenated acrylonitrile-butadiene rubber (H-NBR). Examples of the compound ingredients include a reinforcing material, a filler, a softener, a processing aid, a vulcanization accelerator aid, a crosslinker, a vulcanization accelerator, and an antioxidant.

The rubber composition that makes the compressed rubber layer 11 may include short fibers, such as nylon short fibers. In that case, it is recommended that the short fibers included in the compressed rubber layer 11 be oriented in the belt width direction, and that the short fibers be arranged to protrude from a surface of the compressed rubber layer 11. Instead of being mixed in the rubber composition that makes the compressed rubber layer 11, the short fibers may be attached to the surfaces of the V-shaped ribs 15 of the compressed rubber layer 11.

The cord 14 is made of filament yarn of polyester-based fibers. Examples of the polyester-based fibers which make the cord 14 include polyethylene terephthalate fibers, polyethylene naphthalate fibers, polypropylen terephthalate fibers, polybutylene terephthalate fibers, and fibers of a copolymer of one kind, or two or more kinds, of these substances. The cord 14 may be made of a single kind of polyester-based fibers, or may be made of a mixture of plural kinds of polyester-based fibers. The fiber fineness of a filament of the polyester-based fibers which make the cord 14 is, for example, between 4.4 dtex and 6.6 dtex, and the filament diameter thereof is, for example, between 20 μm and 25 μm.

The total fiber fineness of the polyester-based fibers which make the cord 14 ranges from 2200 dtex to 5500 dtex, suitably 3300 dtex or more to reduce lowering of the belt tension, and suitably 4400 dtex or less to reduce belt flexural rigidity and achieve high efficiency.

The outer diameter D of the cord 14 is suitably 0.50 mm or more, more suitably 0.60 mm or more, and still more suitably 0.70 mm or more to reduce lowering of the belt tension, and suitably 1.00 mm or less, more suitably 0.95 mm or less, and still more suitably 0.85 mm or less to reduce belt flexural rigidity and achieve high efficiency.

A pitch P of the cord 14 in the belt width direction, that is, a distance between centers of the cords 14 adjacent to each other in the belt width direction in a cross section of the belt, is suitably 0.70 mm or more, more suitably 0.75 mm or more, and still more suitably 0.85 mm or more to achieve sufficient adhesion of the cord 14 to the adhesive rubber layer 12 of the V-ribbed belt body 10, and suitably 1.10 mm or less, more suitably 1.05 mm or less, and still more suitably 0.95 mm or less to reduce lowering of the belt tension.

The distance (P-D) between the cords 14 adjacent to each other in the belt width direction is suitably 0.08 mm or more and more suitably 0.13 mm or more to achieve sufficient adhesion of the cord 14 to the adhesive rubber layer 12 of the V-ribbed belt body 10, and suitably 0.20 mm or less and more suitably 0.15 mm or less to reduce lowering of the belt tension.

In the V-ribbed belt B of the embodiment, the fiber fineness of the cord 14 per belt width corresponding to a single V-shaped rib 15 ranges from 10000 dtex to 19000 dtex, suitably 13500 dtex or more to reduce lowering of the belt tension, and suitably 16500 dtex or less to reduce belt flexural rigidity and achieve high efficiency. The fiber fineness of the cord 14 per belt width corresponding to a single V-shaped rib 15 can be obtained by dividing the sum of the fiber fineness of the cords 14 arranged next one another in the belt width direction by the number of the V-shaped ribs 15.

Example yarn configurations of the cord 14 include plied yarn, single twist yarn, lang's lay, and braid yarn. Among these yarns, plied yarn is suitable. Plied yarn is obtained in the following manner: a bundle of fibers composed of a single yarn or a plurality of yarns with a predetermined fiber fineness is twisted in one direction at a predetermined number of twists (first twist) to make a first-twist yarn, and a plurality of these first-twist yarns are collected and twisted in the opposite direction to the first-twist direction at a predetermined number of twists (second twist) to make a plied yarn.

In the cord 14 made of plied yarn, the number of yarns included in the first-twist yarn, that is, the number of yarns which make the first-twist yarn, is suitably one or two in order to maintain a balance between achievement of high efficiency and reduction of lowering of the belt tension. For the same or similar reason, the fiber fineness of the first-twist yarn is suitably 1100 dtex. The number of first twists is suitably 25 times or more/10 cm and more suitably 28 times or more/10 cm, and suitably 32 times or less/10 cm and more suitably 29 times or less/10 cm. The twist factor of the first twists is suitably 700 or more and more suitably 800 or more, and suitably 1100 or less and more suitably 1000 or less. Note that the twist factor is obtained by the following equation (1) (the same hereinafter).

[Equation 1]

$$K = T \times \sqrt{D/1.1} \qquad (1)$$

K: Twist Factor
T: Number of Twists (times/10 cm)
D: Fiber Fineness (dtex)

In the cord 14 made of plied yarn, the number of first-twist yarns included in the second-twist yarn (the plied yarn), that is, the number of threads which make the second-twist yarn, is suitably two or more and more suitably three, and suitably five or less and more suitably four or less in order to maintain a balance between achievement of high efficiency and reduction of lowering of the belt tension. For the same or similar reason, the number of second twists is suitably 8 times or more/10 cm, more suitably 10 times or more/10 cm, and still more suitably 13 times or more/10 cm, and suitably 23 times or less/10 cm, more suitably 21 times or less/10 cm, and still more suitably 18 times or less/10 cm. The twist factor of the second twists is suitably 700 or more and more suitably 800 or more, and suitably 1100 or less and more suitably 1000 or less. Suitably, the twist factor of the second twists is the same as the twist factor of the first twists.

The cord 14 of the plied yarn may be an S-twist yarn, the second twist of which is an S-twist, or a Z-twist yarn, the second twist of which is a Z-twist. Further, an S-twist yarn and a Z-twist yarn arranged in a double helix form may be used as the cords 14 of the plied yarn.

The belt dry-heat shrinkage force of the V-ribbed belt B according to the embodiment is 44 N or more per belt width corresponding to a single V-shaped rib 15, suitably 45 N or more to reduce lowering of the belt tension, and suitably 55 N or less, more suitably 51 N or less, and still more suitably 47 N or less in view of practical use. The belt dry-heat shrinkage force is measured using a test specimen having a belt width corresponding to a single or a plurality of V-shaped ribs 15. A load of 6 N is applied to this test specimen in a belt length direction in an atmosphere of 150° C., and the test specimen is held in this state. The belt dry-heat shrinkage force is measured as a load increase with respect to the length of 300 mm of the test specimen in 30 minutes after the load application and the holding of the belt. If the test specimen has a belt width corresponding to a plurality of V-shaped ribs 15, the load increase is divided by the number of V-shaped ribs 15.

With respect to the V-ribbed belt B according to the embodiment, an Olsen flexural tester is used to measure a belt flexural rigidity EI, which is obtained based on the following equation (2) where n (%) is an indication on a load scale of the tester when the belt is bent in its longitudinal direction at a pendulum swing angle φ of 0.175 rad (=10°). The belt flexural rigidity EI per belt width corresponding to a single V-shaped rib 15 is suitably 0.045 N·m² or more, more suitably 0.050 N·m² or more, and still more suitably 0.060 N·m² or more in view of practical use, and suitably 0.080 N·m² or less, more suitably 0.075 N·m² or less, and still more suitably 0.070 N·m² or less in view of achievement of high efficiency.

[Equation 2]

$$EI = \frac{S}{3} \times \frac{M_0 n}{100\varphi} \quad (2)$$

EI: Flexural Rigidity (N·m²)
S: Span (m)
$M_0$: Pendulum Moment (N·m) at Load Scale Indication of 100%
φ: Flexural Angle (rad)
n: Load Scale Indication (%) Which Corresponds To Flexural Angle φ (rad)

Now, there is an increasing demand for fuel-efficient cars. V-ribbed belts used in an engine compartment of a car are therefore required to function more efficiently than known V-ribbed belts under the same conditions of use. It is effective to use a cord smaller in diameter and reduce the rigidity of the belt in order that the V-ribbed belt may function more efficiently. However, such a belt has a lower belt tension and cannot withstand practical use. In view of this, the V-ribbed belt B of the embodiment configured as described above can achieve high efficiency because the V-ribbed belt B of the embodiment is provided with the thin cord 14 made of polyester-based fibers with the total fiber fineness ranging from 2200 dtex to 5500 dtex. Besides, although the cord 14 is thin, the tension of the V-ribbed belt B is not much reduced and the V-ribbed belt B can well withstand practical use, because the fiber fineness of the cord 14 per belt width corresponding to a single V-shaped rib ranges from 10000 dtex to 19000 dtex, and also because the belt dry-heat shrinkage force per belt width corresponding to a single V-shaped rib (which is a load increase with respect to a belt length of 300 mm in 30 minutes after applying, in an atmosphere of 150° C., a load of 6 N in the belt longitudinal direction and holding the belt) is 44 N or more.

(Method for Forming V-Ribbed Belt B)

Now, a method for forming the V-ribbed belt B according to the embodiment will be described.

A method for forming the V-ribbed belt B according to the embodiment includes a material preparation step, a material positioning step, a vulcanization-molding step, a grinding step, and a width cutting step.

<Material Preparation Step>

Compound ingredients are added to a rubber component, and the mixture is kneaded by a mixer, such as a kneader and a Banbury mixer. The resultant uncrosslinked rubber composition is shaped into a sheet by calendering, for example, to form an uncrosslinked rubber sheet 11' for making a compressed rubber layer. If the short fibers are to be added to the compressed rubber layer 11, it is suitable to add the short fibers to the uncrosslinked rubber sheet 11'. Uncrosslinked rubber sheets 12' and 13' for making the adhesive rubber layer and the backface rubber layer are formed in a similar manner.

The cord 14' undergoes an adhesion treatment in which the cord 14' is soaked in an adhesive agent, such as an RFL aqueous solution, and is heated. The cord 14' also undergoes during this adhesion treatment a stretching and thermal fixation process in which the cord 14' is stretched while tension is applied to the cord 14'.

The RFL aqueous solution is obtained by adding latex to an initial condensate of resorcin and formaldehyde. The temperature of the RFL aqueous solution is between 20° C. and 30° C., for example. The solid content concentration of the RFL aqueous solution is 30% by mass or less, for example. The molar ratio (R/F) between resorcin (R) and formalin (F) is between 1/2 and 1/1, for example. Examples of the latex include vinylpyridine-styrene-butadiene rubber latex (Vp-SBR), chloroprene rubber latex (CR), and chlorosulfonated polyethylene rubber. The mass ratio of the latex (L) (RF/L) is, for example, between 1/20 and 1/5.

The period of soaking of the cord 14' in the RFL aqueous solution is between one and three seconds, for example. The heating temperature (i.e., a furnace temperature) after the soaking in the RFL aqueous solution is between 200° C. and 250° C., for example. The period of heating (i.e., dwell time in the furnace) is between one and three minutes, for example. The tension to be applied to the cord 14' in the stretching and thermal fixation process during the adhesion treatment using the RFL aqueous solution is between 0.91 cN/dtex and 1.67 cN/dtex, for example. The adhesion treatment for the cord 14' using the RFL aqueous solution may be conducted only once, or may be conducted a plurality of times. RFL solids adhere to an inner portion and a surface of the cord 14'. The adhesion amount (i.e., coating weight) of the RFL solids with respect to the mass of the polyester-based fibers which make the cord 14' is suitably 4% by mass or more, more suitably 6% by mass or more, and still more suitably 6.5% by mass or more to achieve sufficient adhesion of the cord 14 to the adhesive rubber layer 12 of the V-ribbed belt body 10, and suitably 10% by mass or less, more suitably 8% by mass or less, and still more suitably 7.5% by mass or less to reduce belt flexural rigidity and achieve high efficiency.

The cord 14' may undergo, prior to the adhesion treatment using the RFL aqueous solution, another adhesion treatment in which the cord 14' is soaked in a primary coat solution and heated. The primary coat solution is obtained by dissolving epoxy or isocyanate (blocked isocyanate) in a solvent, such as toluene, or by dispersing said substance in water. The temperature of the primary coat solution is between 20° C. and 30° C., for example. The solid content concentration of the primary coat solution is 20% by mass or less, for example.

The period of soaking of the cord 14' in the primary coat solution is between one and three seconds, for example. The heating temperature (i.e., a furnace temperature) after the soaking in the primary coat solution is between 200° C. and 250° C., for example. The period of heating (i.e., dwell time in the furnace) is between one and three minutes, for example. The tension to be applied to the cord 14' in the stretching and thermal fixation process during the adhesion treatment using the primary coat solution is between 0.30 cN/dtex and 0.61 cN/dtex, for example. The adhesion treatment for the cord 14' using the primary coat solution may be conducted only once, or may be conducted a plurality of times. Resin solids adhere to an inner portion and a surface of the cord 14'. The adhesion amount (i.e., coating weight) of the resin solids with respect to the mass of the polyester-based fibers which make the cord 14' is suitably 2% by mass or more and more suitably 3% by mass or more to achieve sufficient adhesion of the cord 14 to the adhesive rubber layer 12 of the V-ribbed belt body 10, and suitably 6% by mass or less and more suitably 5% by mass or less to reduce belt flexural rigidity and achieve high efficiency.

The cord 14' may undergo, after the adhesion treatment using the RFL aqueous solution, another adhesion treatment in which the cord 14' is soaked in rubber cement and dried by heating. The rubber cement is obtained by dissolving an unvulcanized rubber composition in a solvent, such as toluene. The temperature of the rubber cement is between 20° C. and 30° C., for example. The solid content concentration of the rubber cement is 20% by mass or less, for example.

The period of soaking of the cord 14' in the rubber cement is between one and three seconds, for example. The heating temperature (i.e., a furnace temperature) after the soaking in the rubber cement is between 50° C. and 100° C., for example. The period of drying (i.e., dwell time in the furnace) is between one and three minutes, for example. The tension to be applied to the cord 14' during the adhesion treatment using the rubber cement is between 0.30 cN/dtex and 0.61 cN/dtex, for example. The adhesion treatment for the cord 14' using the rubber cement may be conducted only once, or may be conducted a plurality of times. A rubber cement film adheres to a surface of the cord 14'. The adhesion amount (i.e., coating weight) of the rubber cement film is, for example, 2% by mass or more and 5% by mass or less with respect to the mass of the polyester-based fibers which make the cord 14'.

A degree of stretching in the stretching and thermal fixation process performed on the cord 14' during the adhesion treatment is suitably greater than 6.0%, more suitably 6.2% or more, and still more suitably 6.5% or more to reduce the impregnation of the adhesive agent and thus reduce belt flexural rigidity and achieve high efficiency, and reduce lowering of the belt tension, and suitably 7.5% or less, more suitably 7.2% or less, and still more suitably 7.0% or less in view of practical use.

The dry-heat shrinkage force of the cord 14' after the adhesion treatment and the stretching and thermal fixation process is suitably 0.20 cN/dtex or more, more suitably 0.25 cN/dtex or more, and still more suitably 0.28 cN/dtex or more to reduce lowering of the belt tension, and 0.50 cN/dtex or less, more suitably 0.45 cN/dtex or less, and still more suitably 0.35 cN/dtex or less in view of practical use. The dry-heat shrinkage force is measured based on JIS L1017.

<Material Positioning Step>

Figure 3:
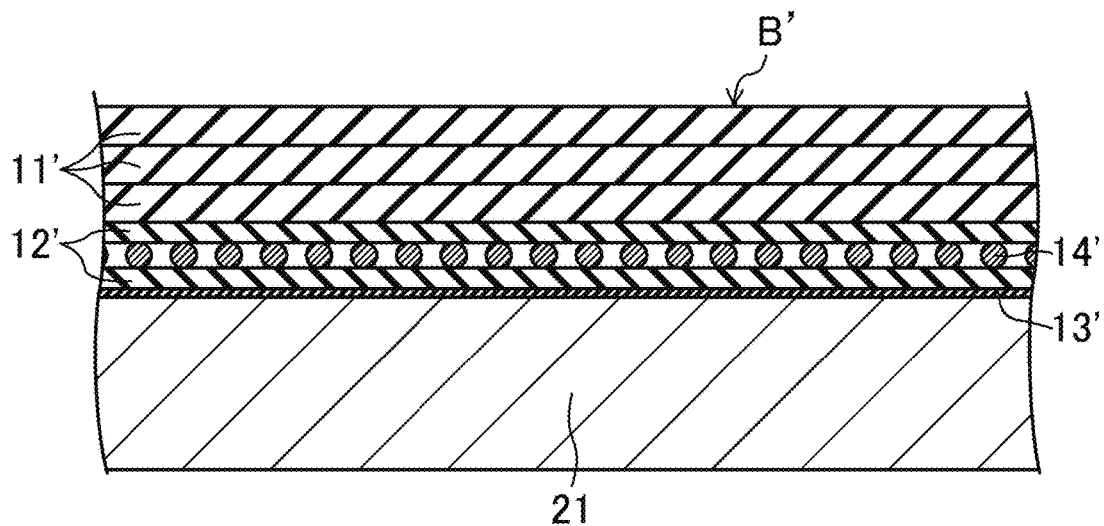
FIG. 3 is a first drawing for explaining a method for forming the V-ribbed belt according to the embodiment.

Subsequently, as illustrated in FIG. 3, the uncrosslinked rubber sheet 13' for making the backface rubber layer and the uncrosslinked rubber sheet 12' for making the adhesive rubber layer are sequentially wrapped around a cylindrical mold 21 so that they are layered on the outer surface of the cylindrical mold 21. The cord 14' which has undergone the adhesion treatment and the stretching and thermal fixation process is wrapped around the resultant layers on the cylindrical mold 21 in a helical manner with a predetermined tension applied to the cord 14'. Further, the uncrosslinked rubber sheet 12' for making the adhesive rubber layer and the uncrosslinked rubber sheet 11' for making the compressed rubber layer are sequentially wrapped around, and layered on, the cylindrical mold 21, thereby obtaining a layered body B'. The tension applied to the cord 14' while the cord 14' is wrapped is suitably 0.18 N/dtex or more and more suitably 0.20 N/dtex or more to reduce lowering of the belt tension, and suitably 0.27 N/dtex or less and more suitably 0.25 N/dtex or less in view of practical use.

<Vulcanization-Molding Step>

Figure 4:
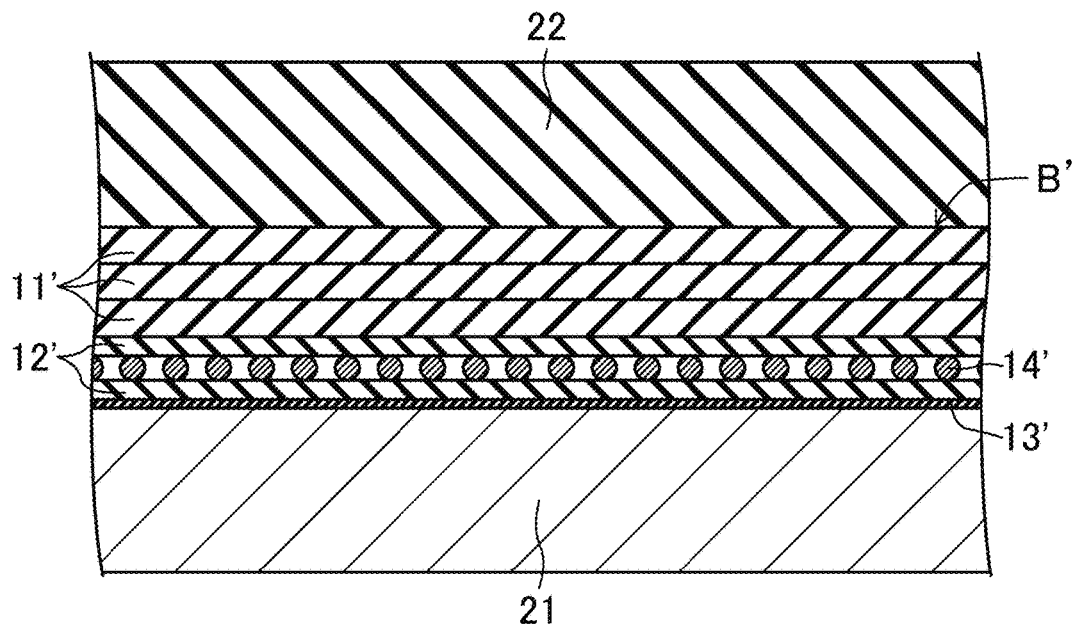
FIG. 4 is a second drawing for explaining a method for forming the V-ribbed belt according to the embodiment.
Figure 5:
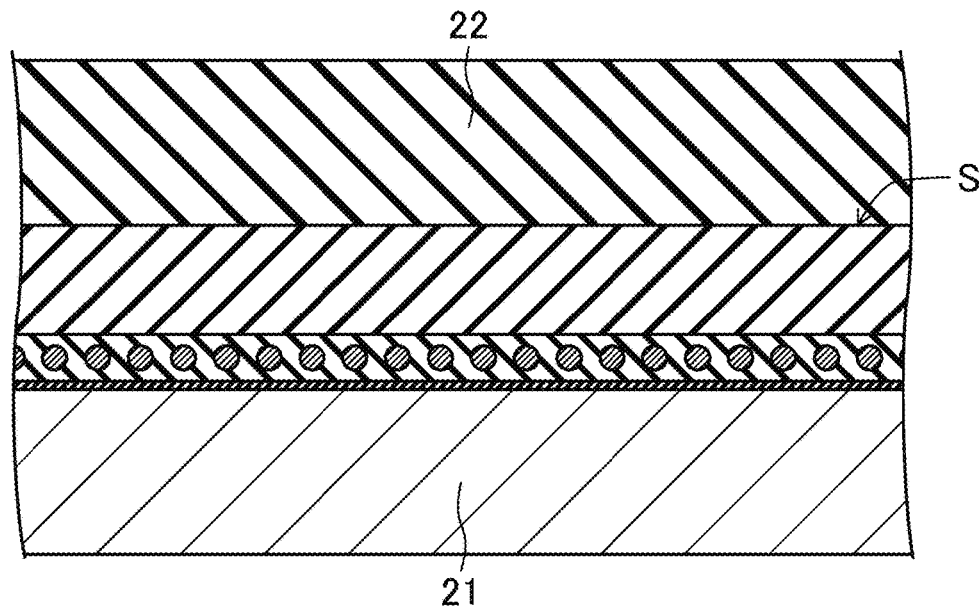
FIG. 5 is a third drawing for explaining a method for forming the V-ribbed belt according to the embodiment.

Subsequently, as illustrated in FIG. 4, a rubber sleeve 22 is placed on the layered body B'. The layered body B' with the rubber sleeve 22 is placed in a vulcanizer, and the vulcanizer is sealed. The vulcanizer is filled with high-temperature and high-pressure steam, and the layered body B' with the rubber sleeve 22 is held in the vulcanizer for a predetermined molding time. At this moment, as illustrated in FIG. 5, cross-linking is promoted in the uncrosslinked rubber sheets 11', 12', and 13', which are integrated with each other and combined with the cord 14'. As a result, a cylindrical belt slab S is formed. The molding temperature of the belt slab S is, for example, between 100° C. and 180° C. The molding pressure is, for example, between 0.5 Mpa and 2.0 Mpa. The molding time is, for example, between 10 to 60 minutes.

<Grinding Step>

Figure 6:
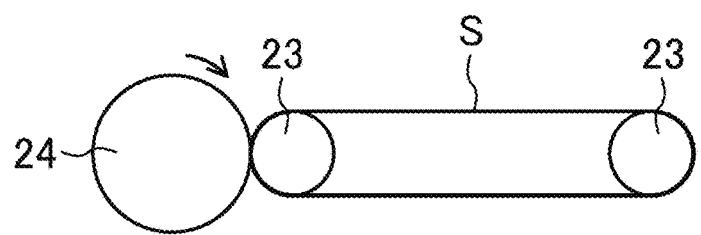
FIG. 6 is a fourth drawing for explaining a method for forming the V-ribbed belt according to the embodiment.
Figure 7:
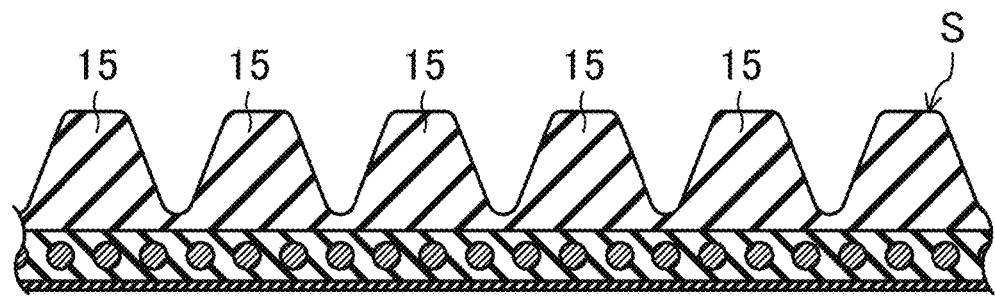
FIG. 7 is a fifth drawing for explaining a method for forming the V-ribbed belt according to the embodiment.

Then, the steam is released from the vulcanizer to end the state of sealing. The belt slab S formed on the cylindrical mold 21 is removed from the mold, and is looped over a pair of slab holding shafts 23 as shown in FIG. 6. A grinding stone 24, which has V-shaped rib formation grooves extending in a circumferential direction of the grinding stone 24 and arranged next to one another in the axial direction of the grinding stone 24, is rotated and brought into contact with the outer surface of the belt slab S, while the belt slab S is also rotated on the pair of slab holding shafts 23, thereby grinding the belt slab S all over the outer surface thereof. As a result, V-shaped ribs 15 are formed on the outer surface of the belt slab S as illustrated in FIG. 7. If necessary, the belt slab S may be cut into pieces in its lengthwise direction for grinding.

<Width Cutting Step>

The belt slab S in which the V-shaped ribs 15 are formed by grinding is cut into pieces having a predetermined width, and turned inside out. The V-ribbed belt B is obtained in this manner.

(Accessory Drive Belt Transmission System 30)

Figure 8:
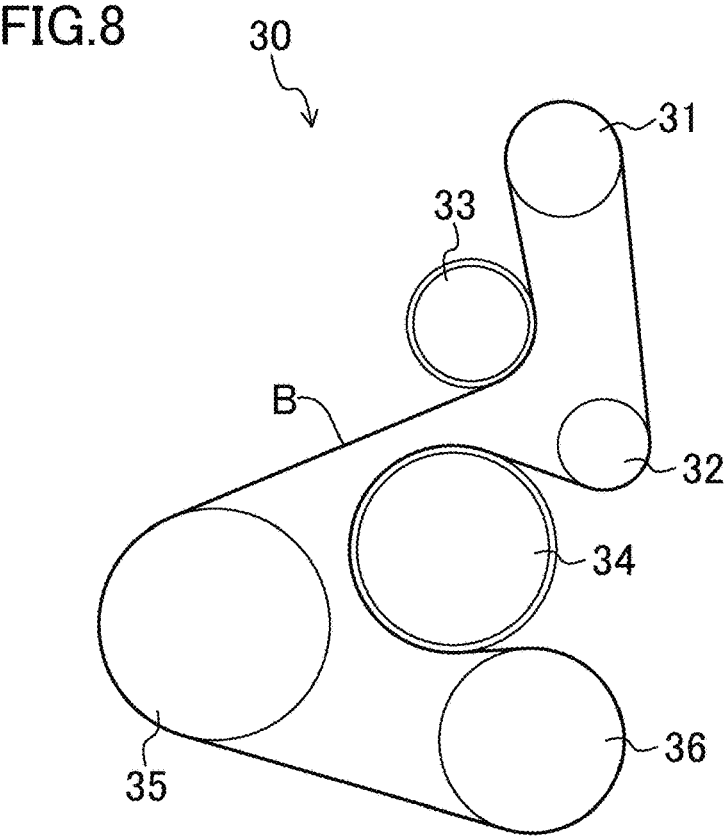
FIG. 8 illustrates a layout of pulleys of an accessory drive belt transmission system of an automobile.

FIG. 8 illustrates a layout of pulleys of an accessory drive belt transmission system 30 of an automobile using the V-ribbed belt B according to the embodiment. The accessory drive belt transmission system 30 is a serpentine drive system in which the V-ribbed belt B is wrapped around six pulleys including four ribbed pulleys and two flat pulleys to transmit power.

The accessory drive belt transmission system 30 includes a power steering pulley 31, which is a ribbed pulley, at an uppermost position, and an AC generator pulley 32, which is a ribbed pulley, located below the power steering pulley 31. The system 30 also includes a tensioner pulley 33, which is a flat pulley, located at a lower left position of the power steering pulley 31, and a water pump pulley 34, which is a flat pulley, located below the tensioner pulley 33. The system 30 further includes a crank shaft pulley 35, which is a ribbed pulley, located at a lower left position of the tensioner pulley 33, and an air conditioning pulley 36, which is a ribbed pulley, located at a lower right position of the crank shaft pulley 35. These pulleys are made, for example, of pressed metals or castings, or resin moldings using, e.g., nylon resin and phenol resin, with a pulley diameter ranging from φ50 mm to φ150 mm.

In the accessory drive belt transmission system 30, the V-ribbed belt B is wrapped around the power steering pulley 31 with the V-shaped ribs 15 brought into contact with the power steering pulley 31, and then around the tensioner pulley 33 with the backface of the belt B brought into contact with the tensioner pulley 33. After that, the belt B is sequentially wrapped around the crank shaft pulley 35 and the air conditioning pulley 36 with the V-shaped ribs 15 brought into contact with the crank shaft pulley 35 and the air conditioning pulley 36, and further around the water pump pulley 34 with the backface of the belt B brought into contact with the water pump pulley 34. The belt B is then wrapped around the AC generator pulley 32 with the V-shaped ribs 15 brought into contact with the AC generator pulley 32, and returns to the power steering pulley 31 in the end. The belt span length, which is a length of the V-ribbed belt B between the pulleys, ranges from 50 mm to 300 mm, for example. The degree of misalignment allowable between the pulleys ranges from 0° to 2°.

EXAMPLE (V-Ribbed Belt)

V-ribbed belts of the following Examples 1 to 4 and Comparative Examples 1 to 5 were prepared. Configurations of each belt are shown in Tables 1 and 2.

Example 1

Two first-twist yarns, each obtained by twisting in an S direction a bundle of 1100 dtex polyester fibers (manufactured by TEIJIN LIMITED) at the number of first twists of 28.6 times/10 cm (a twist factor of 900), were collected and secondarily twisted in a Z direction at the number of second twists of 20.2 times/10 cm (a twist factor of 900), thereby preparing a cord of plied yarn.

This cord sequentially underwent an adhesion treatment in which the cord was soaked in a primary coat solution and heated, an adhesion treatment in which the cord was soaked in an RFL aqueous solution and heated, and an adhesion treatment in which the cord was soaked in rubber cement and heated. An isocyanate resin toluene solution was used as the primary coat solution. The adhesion treatment using the primary coat solution was performed once. The RFL aqueous solution which contains vinylpyridine styrene butadiene rubber latex as the latex component was used. The adhesion treatment using the RFL aqueous solution was performed twice. Rubber cement obtained by dissolving, in toluene, a rubber composition for making the adhesive rubber layer was used as the rubber cement. The adhesion treatment using the rubber cement was performed once. Along with these adhesion treatments, a stretching and thermal fixation process with a degree of stretching of 7.2% was performed.

Of the substances adhered to the cord which had undergone these adhesion treatments, the adhesion amount (i.e., coating weight) of resin solids as a result of the adhesion treatment using the primary coat solution was 4.0% by mass, the adhesion amount (i.e., coating weight) of RFL solids as a result of the adhesion treatment using the RFL aqueous solution was 8.0% by mass, and the adhesion amount (i.e., coating weight) of a rubber cement film as a result of the adhesion treatment using the rubber cement was 4.0% by mass, with respect to the mass of the polyester-based fibers which make the cord. The dry-heat shrinkage force, measured based on JIS L1017, of the cord after the adhesion treatments and the stretching and thermal fixation process was 0.43 cN/dtex.

A V-ribbed belt was prepared by a method similar to the method described in the above embodiment, using this cord which had undergone the adhesion treatments and the stretching and thermal fixation process. The tension applied to the cord while the cord was wrapped was 0.23 cN/dtex. The pitch P of the cord in the belt width direction was 0.75 mm. The outer diameter D of the cord was 0.60 mm. The distance (P-D) between the cords adjacent to each other in the belt width direction was 0.15 mm. The fiber fineness of the cord per belt width corresponding to a single V-shaped rib was 10443 dtex.

Each of the compressed rubber layer, the adhesive rubber layer, and the backface rubber layer were made of a rubber composition containing EPDM as a rubber component. Belts were formed to have a circumference of 1200 mm, a thickness of 4.3 mm, and a width of 3.56 mm corresponding to a single V-shaped rib, and were formed in three sizes having two V-shaped ribs (i.e., the belt width of 7.12 mm), four V-shaped ribs (i.e., the belt width of 14.24 mm), and six V-shaped ribs (i.e., the belt width of 21.36 mm).

Example 2

Three first-twist yarns, each obtained by twisting in the S direction a bundle of 1100 dtex polyester fibers at the number of first twists of 28.6 times/10 cm (a twist factor of 900), were collected and secondarily twisted in the Z direction at the number of second twists of 16.5 times/10 cm (a twist factor of 900), thereby preparing a cord of plied yarn. A V-ribbed belt was prepared in a similar manner to the V-ribbed belt of Example 1 except that the degree of stretching in the stretching and thermal fixation process was set to be 6.8% and that the pitch P of the cord in the belt width direction was set to be 0.85 mm. The thus obtained V-ribbed belt is referred to Example 2.

Of the substances adhered to the cord which had undergone the adhesion treatments, the adhesion amount (i.e., coating weight) of resin solids as a result of the adhesion treatment using the primary coat solution was 4.0% by mass, the adhesion amount (i.e., coating weight) of RFL solids as a result of the adhesion treatment using the RFL aqueous solution was 7.0% by mass, and the adhesion amount (i.e., coating weight) of a rubber cement film as a result of the adhesion treatment using the rubber cement was 3.6% by mass, with respect to the mass of the polyester-based fibers which make the cord. The dry-heat shrinkage force of the cord after the adhesion treatments and the stretching and thermal fixation process was 0.32 cN/dtex. The outer diameter D of the cord was 0.71 mm. The distance (P-D) between the cords adjacent to each other in the belt width direction was 0.14 mm. The fiber fineness of the cord per belt width corresponding to a single V-shaped rib was 13821 dtex.

Example 3

Four first-twist yarns, each obtained by twisting in the S direction a bundle of 1100 dtex polyester fibers at the number of first twists of 28.6 times/10 cm (a twist factor of 900), were collected and secondarily twisted in the Z direction at the number of second twists of 14.3 times/10 cm (a twist factor of 900), thereby preparing a cord of plied yarn. A V-ribbed belt was prepared in a similar manner to the V-ribbed belt of Example 1 except that the degree of stretching in the stretching and thermal fixation process was set to be 6.8% and that the pitch P of the cord in the belt width direction was set to be 0.95 mm. The thus obtained V-ribbed belt is referred to Example 3.

Of the substances adhered to the cord which had undergone the adhesion treatments, the adhesion amount (i.e., coating weight) of resin solids as a result of the adhesion treatment using the primary coat solution was 4.0% by mass, the adhesion amount (i.e., coating weight) of RFL solids as a result of the adhesion treatment using the RFL aqueous solution was 6.5% by mass, and the adhesion amount (i.e., coating weight) of a rubber cement film as a result of the adhesion treatment using the rubber cement was 3.3% by mass, with respect to the mass of the polyester-based fibers which make the cord. The dry-heat shrinkage force of the cord after the adhesion treatments and the stretching and thermal fixation process was 0.29 cN/dtex. The outer diameter D of the cord was 0.82 mm. The distance (P-D) between the cords adjacent to each other in the belt width direction was 0.13 mm. The fiber fineness of the cord per belt width corresponding to a single V-shaped rib was 16488 dtex.

Example 4

Five first-twist yarns, each obtained by twisting in the S direction a bundle of 1100 dtex polyester fibers at the number of first twists of 28.6 times/10 cm (a twist factor of 900), were collected and secondarily twisted in the Z direction at the number of second twists of 12.8 times/10 cm (a twist factor of 900), thereby preparing a cord of plied yarn. A V-ribbed belt was prepared in a similar manner to the V-ribbed belt of Example 1 except that the degree of stretching in the stretching and thermal fixation process was set to be 6.2% and that the pitch P of the cord in the belt width direction was set to be 1.05 mm. The thus obtained V-ribbed belt is referred to Example 4.

Of the substances adhered to the cord which had undergone the adhesion treatments, the adhesion amount (i.e., coating weight) of resin solids as a result of the adhesion treatment using the primary coat solution was 4.0% by mass, the adhesion amount (i.e., coating weight) of RFL solids as a result of the adhesion treatment using the RFL aqueous solution was 6.0% by mass, and the adhesion amount (i.e., coating weight) of a rubber cement film as a result of the adhesion treatment using the rubber cement was 3.0% by mass, with respect to the mass of the polyester-based fibers which make the cord. The dry-heat shrinkage force of the cord after the adhesion treatments and the stretching and thermal fixation process was 0.27 cN/dtex. The outer diameter D of the cord was 0.91 mm. The distance (P-D) between the cords adjacent to each other in the belt width direction was 0.14 mm. The fiber fineness of the cord per belt width corresponding to a single V-shaped rib was 18684 dtex.

Comparative Example 1

Total 2200 dtex polyester fibers composed of two bundles of 1100 dtex polyester fibers were used as a first-twist yarn. Three first-twist yarns, each obtained by twisting in the S direction the 2200 dtex polyester fibers at the number of first twists of 20.2 times/10 cm (a twist factor of 900), were collected and secondarily twisted in the Z direction at the number of second twists of 11.7 times/10 cm (a twist factor of 900), thereby preparing a cord of plied yarn. A V-ribbed belt was prepared in a similar manner to the V-ribbed belt of Example 1 except that the degree of stretching in the stretching and thermal fixation process was set to be 6.3% and that the pitch P of the cord in the belt width direction was set to be 1.15 mm. The thus obtained V-ribbed belt is referred to Comparative Example 1.

Of the substances adhered to the cord which had undergone the adhesion treatments, the adhesion amount (i.e., coating weight) of resin solids as a result of the adhesion treatment using the primary coat solution was 4.0% by mass, the adhesion amount (i.e., coating weight) of RFL solids as a result of the adhesion treatment using the RFL aqueous solution was 5.7% by mass, and the adhesion amount (i.e., coating weight) of a rubber cement film as a result of the adhesion treatment using the rubber cement was 2.8% by mass, with respect to the mass of the polyester-based fibers which make the cord. The dry-heat shrinkage force of the cord after the adhesion treatments and the stretching and thermal fixation process was 0.28 cN/dtex. The outer diameter D of the cord was 1.00 mm. The distance (P-D) between the cords adjacent to each other in the belt width direction was 0.15 mm. The fiber fineness of the cord per belt width corresponding to a single V-shaped rib was 19800 dtex.

Comparative Example 2

A V-ribbed belt was prepared in a similar manner to the V-ribbed belt of Comparative Example 1 except that the degree of stretching in the stretching and thermal fixation process was set to be 5.5%. The thus obtained V-ribbed belt is referred to Comparative Example 2.

Of the substances adhered to the cord which had undergone the adhesion treatments, the adhesion amount (i.e., coating weight) of resin solids as a result of the adhesion treatment using the primary coat solution was 4.0% by mass, the adhesion amount (i.e., coating weight) of RFL solids as a result of the adhesion treatment using the RFL aqueous solution was 5.7% by mass, and the adhesion amount (i.e., coating weight) of a rubber cement film as a result of the adhesion treatment using the rubber cement was 2.8% by mass, with respect to the mass of the polyester-based fibers which make the cord. The dry-heat shrinkage force of the cord after the adhesion treatments and the stretching and thermal fixation process was 0.27 cN/dtex. The outer diameter D of the cord was 1.15 mm. The distance (P-D) between the cords adjacent to each other in the belt width direction was 0.15 mm. The fiber fineness of the cord per belt width corresponding to a single V-shaped rib was 19800 dtex.

Comparative Example 3

A V-ribbed belt was prepared in a similar manner to the V-ribbed belt of Example 3 except that the degree of stretching in the stretching and thermal fixation process was set to be 5.5%. The thus obtained V-ribbed belt is referred to Comparative Example 3.

Of the substances adhered to the cord which had undergone the adhesion treatments, the adhesion amount (i.e., coating weight) of resin solids as a result of the adhesion treatment using the primary coat solution was 4.0% by mass, the adhesion amount (i.e., coating weight) of RFL solids as a result of the adhesion treatment using the RFL aqueous solution was 6.5%, and the adhesion amount (i.e., coating weight) of a rubber cement film as a result of the adhesion treatment using the rubber cement was 3.3% by mass, with respect to the mass of the polyester-based fibers which make the cord. The dry-heat shrinkage force of the cord after the adhesion treatments and the stretching and thermal fixation process was 0.26 cN/dtex. The outer diameter D of the cord was 0.82 mm. The distance (P-D) between the cords adjacent to each other in the belt width direction was 0.13 mm. The fiber fineness of the cord per belt width corresponding to a single V-shaped rib was 16488 dtex.

Comparative Example 4

A V-ribbed belt was prepared in a similar manner to the V-ribbed belt of Example 2 except that the degree of stretching in the stretching and thermal fixation process was set to be 5.8%. The thus obtained V-ribbed belt is referred to Comparative Example 4.

Of the substances adhered to the cord which had undergone the adhesion treatments, the adhesion amount (i.e., coating weight) of resin solids as a result of the adhesion treatment using the primary coat solution was 4.0% by mass, the adhesion amount (i.e., coating weight) of RFL solids as a result of the adhesion treatment using the RFL aqueous solution was 7.0% by mass, and the adhesion amount (i.e., coating weight) of a rubber cement film as a result of the adhesion treatment using the rubber cement was 3.6% by mass, with respect to the mass of the polyester-based fibers which make the cord. The dry-heat shrinkage force of the cord after the adhesion treatments and the stretching and thermal fixation process was 0.27 cN/dtex. The outer diameter D of the cord was 0.71 mm. The distance (P-D) between the cords adjacent to each other in the belt width direction was 0.14 mm. The fiber fineness of the cord per belt width corresponding to a single V-shaped rib was 13821 dtex.

Comparative Example 5

A V-ribbed belt was prepared in a similar manner to the V-ribbed belt of Example 1 except that the degree of stretching in the stretching and thermal fixation process was set to be 5.8%. The thus obtained V-ribbed belt is referred to Comparative Example 5.

Of the substances adhered to the cord which had undergone the adhesion treatments, the adhesion amount (i.e., coating weight) of resin solids as a result of the adhesion treatment using the primary coat solution was 4.0% by mass, the adhesion amount (i.e., coating weight) of RFL solids as a result of the adhesion treatment using the RFL aqueous solution was 8.0% by mass, and the adhesion amount (i.e., coating weight) of a rubber cement film as a result of the adhesion treatment using the rubber cement was 4.0% by mass, with respect to the mass of the polyester-based fibers which make the cord. The dry-heat shrinkage force of the cord after the adhesion treatments and the stretching and thermal fixation process was 0.34 cN/dtex. The outer diameter D of the cord was 0.60 mm. The distance (P-D) between the cords adjacent to each other in the belt width direction was 0.15 mm. The fiber fineness of the cord per belt width corresponding to a single V-shaped rib was 10443 dtex.

TABLE 1

|  |  |  | Example | | | |
|---|---|---|---|---|---|---|
|  |  |  | 1 | 2 | 3 | 4 |
| Cord | First-Twist Yarn | Number of Yarns Making First-Twist Yarn | 1 | 1 | 1 | 1 |
|  |  | Fiber Fineness (dtex) | 1100 | 1100 | 1100 | 1100 |
|  |  | Number of Twists (Times/10 cm) | 28.6 | 28.6 | 28.6 | 28.6 |
|  |  | Twist Factor | 900 | 900 | 900 | 900 |
|  | Second-Twist Yarn (Plied Yarn) | Number of First-Twist Yarns Making Second-Twist Yarn | 2 | 3 | 4 | 5 |
|  |  | Total Fiber Fineness (dtex) | 2200 | 3300 | 4400 | 5500 |
|  |  | Number of Twists (Times/10 cm) | 20.2 | 16.5 | 14.3 | 12.8 |
|  |  | Twist Factor | 900 | 900 | 900 | 900 |
| Degree of Stretching in Stretching And Thermal Fixation Process (%) | | | 7.2 | 6.8 | 6.8 | 6.2 |
| Resin Solids Adhesion Amount (Coating Weight) (mass %) | | | 4.0 | 4.0 | 4.0 | 4.0 |
| RFL Solids Adhesion Amount (Coating Weight) (mass %) | | | 8.0 | 7.0 | 6.5 | 6.0 |
| Rubber Cement Film Adhesion Amount (Coating Weight) (mass %) | | | 4.0 | 3.6 | 3.3 | 3.0 |
| Dry-Heat Shrinkage Force of Cord (cN/dtex) | | | 0.43 | 0.32 | 0.29 | 0.27 |
| Tension Applied To Cord During Cord Wrapping (cN/dtex) | | | 0.23 | 0.23 | 0.23 | 0.23 |
| Cord Pitch P in Belt Width Direction (mm) | | | 0.75 | 0.85 | 0.95 | 1.05 |
| Cord Outer Diameter D (mm) | | | 0.60 | 0.71 | 0.82 | 0.91 |
| Distance Between Adjacent Cords (P − D) (mm) | | | 0.15 | 0.14 | 0.13 | 0.14 |
| Cord Fiber Fineness Per Belt Width Corresponding To Single V-Shaped Rib (dtex) | | | 10443 | 13821 | 16488 | 18648 |

TABLE 2

|  |  |  | Comparative Example | | | | |
|---|---|---|---|---|---|---|---|
|  |  |  | 1 | 2 | 3 | 4 | 5 |
| Cord | First-Twist Yarn | Number of Yarns Making First-Twist Yarn | 2 | 2 | 1 | 1 | 1 |
|  |  | Fiber Fineness (dtex) | 2200 | 2200 | 1100 | 1100 | 1100 |
|  |  | Number of Twists (Times/10 cm) | 20.2 | 20.2 | 28.6 | 28.6 | 28.6 |
|  |  | Twist Factor | 900 | 900 | 900 | 900 | 900 |
|  | Second-Twist Yarn (Plied Yarn) | Number of First-Twist Yarns Making Second-Twist Yarn | 3 | 3 | 4 | 3 | 2 |
|  |  | Total Fiber Fineness (dtex) | 6600 | 6600 | 4400 | 3300 | 2200 |
|  |  | Number of Twists (Times/10 cm) | 11.7 | 11.7 | 14.3 | 16.5 | 20.2 |
|  |  | Twist Factor | 900 | 900 | 900 | 900 | 900 |
| Degree of Stretching in Stretching And Thermal Fixation Process (%) | | | 6.3 | 5.5 | 5.5 | 5.8 | 5.8 |
| Resin Solids Adhesion Amount (Coating Weight) (mass %) | | | 4.0 | 4.0 | 4.0 | 4.0 | 4.0 |
| RFL Solids Adhesion Amount (Coating Weight) (mass %) | | | 5.7 | 5.7 | 6.5 | 7.0 | 8.0 |
| Rubber Cement Film Adhesion Amount (Coating Weight) (mass %) | | | 2.8 | 2.8 | 3.3 | 3.6 | 4.0 |
| Dry-Heat Shrinkage Force of Cord (cN/dtex) | | | 0.28 | 0.27 | 0.26 | 0.27 | 0.34 |
| Tension Applied To Cord During Cord Wrapping (cN/dtex) | | | 0.23 | 0.23 | 0.23 | 0.23 | 0.23 |
| Cord Pitch P in Belt Width Direction (mm) | | | 1.15 | 1.15 | 0.95 | 0.85 | 0.75 |
| Cord Outer Diameter D (mm) | | | 1.0 | 1.0 | 0.82 | 0.71 | 0.60 |
| Distance Between Adjacent Cords (P − D) (mm) | | | 0.15 | 0.15 | 0.13 | 0.14 | 0.15 |
| Cord Fiber Fineness Per Belt Width Corresponding To Single V-Shaped Rib (dtex) | | | 19800 | 19800 | 16488 | 13821 | 10443 |

(Test Method)

<Belt Flexural Rigidity>

A test specimen having a belt width of 3.56 mm corresponding to a single V-shaped rib was cut out from each of the V-ribbed belts of Examples 1 to 4 and Comparative Examples 1 to 5. An Olsen flexural tester was used to measure a belt flexural rigidity EI, which is obtained based on the equation (2), shown above, where n (%) is an indication on a load scale of the tester when the test specimen was bent in its longitudinal direction at a pendulum swing angle φ of 0.175 rad (=10°).

<Belt Dry-Heat Shrinkage Force>

Figure 9:
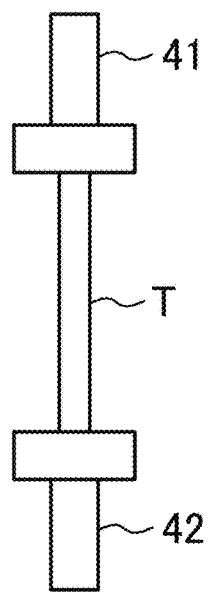
FIG. 9 illustrates how to measure a belt dry-heat shrinkage force.

A test specimen T having a belt width of 3.56 mm corresponding to a single V-shaped rib was cut out from each of the V-ribbed belts of Examples 1 to 4 and Comparative Examples 1 to 5. As illustrated in FIG. 9, the test specimen T was fixed by an upper chuck 41, which is provided with a load cell, and a lower chuck 42 such that the test specimen T had a belt length of 300 mm between the two chucks. The lower chuck 42 was moved down until a load of 6N was applied to the test specimen T in its longitudinal direction in an atmosphere of 150° C., and then the chuck 42 was fixed. A load after a lapse of 30 minutes was measured. An increase in the load was referred to as a belt dry-heat shrinkage force.

<Belt's Drive Force Loss>

Figure 10A:
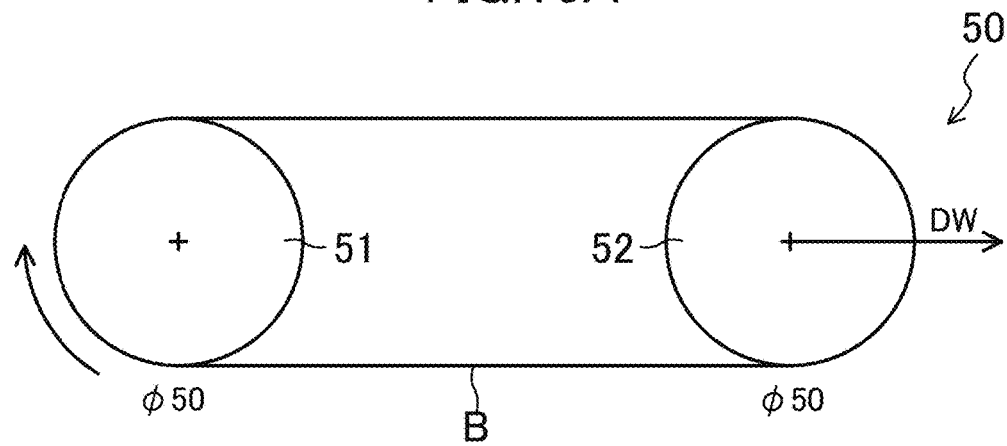
FIG. 10A illustrates a front view of a belt's drive force loss measurement device.
Figure 10B:
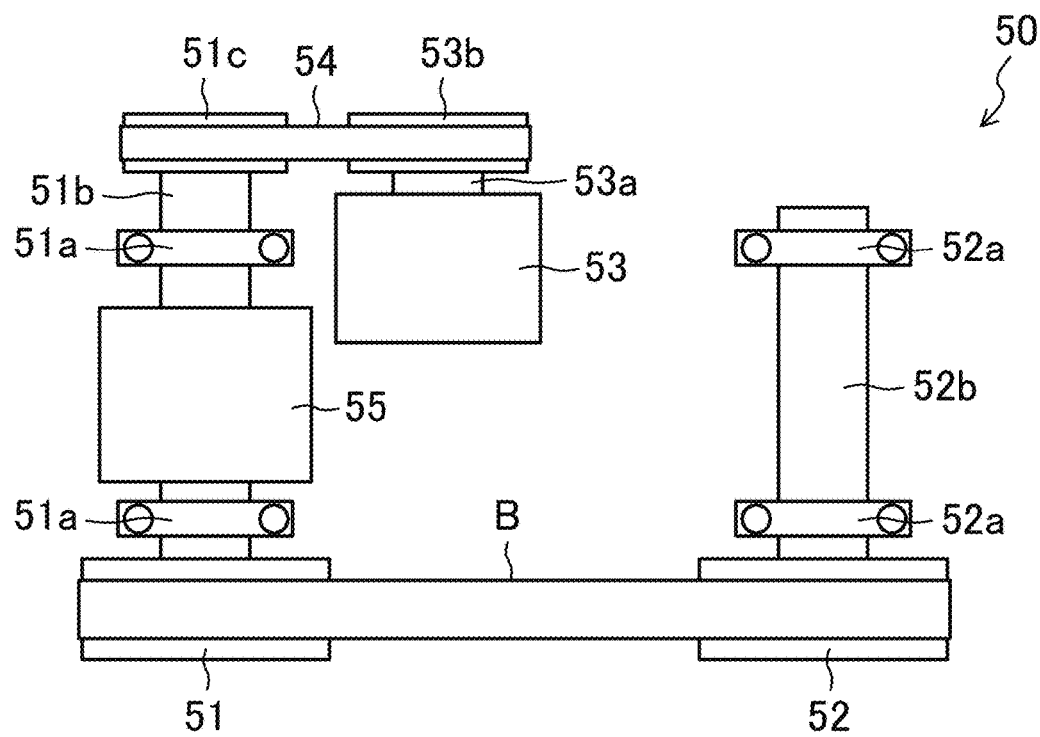
FIG. 10B illustrates a plan view of the belt's drive force loss measurement device.

FIGS. 10A and 10B illustrate a belt's drive force loss measurement device 50.

The belt's drive force loss measurement device 50 has a drive pulley 51, which is a ribbed pulley, having a diameter of 50 mm, and a driven pulley 52, which is a ribbed pulley, having a diameter of 50 mm and arranged on the right side of the drive pulley 51. The drive pulley 51 is attached to one end of a drive shaft 51b rotatably supported by a pair of spindle bases 51a arranged apart from each other. A torquing pulley 51c is provided at the other end of the drive shaft 51b. A motor pulley 53b pivoted on a motor shaft 53a of a drive motor 53 is provided on the right side of the torquing pulley 51c. A rotational drive belt 54 is looped around the torquing pulley 51c and the motor pulley 53b. A torque meter 55 is provided between the pair of spindle bases 51a to detect a rotational torque of the drive shaft 51b. The driven pulley 52 is attached to one end of a driven shaft 52b rotatably supported by a pair of spindle bases 52a arranged apart from each other, the whole of which is movable in a lateral direction.

Each of the V-ribbed belts of Examples 1 to 4 and Comparative Examples 1 to 5 having two V-shaped ribs was looped around the drive pulley 51 and the driven pulley 52, and a dead weight (DW) of 600 N was applied to the driven pulley 52 toward the right side. The drive pulley 51 was rotated at 3000 rpm by the drive motor 53 at room temperature atmosphere to run the belt. The drive torque at that moment was measured by the torque meter 55. Drive torque of the belts having four V-shaped ribs and six V-shaped ribs was also measured in a similar manner. Note that the drive torque was measured after one-hour running of the belt to eliminate the influence of such as heating and measure stable torque.

A belt flexural rigidity of each of the V-ribbed belts having two, four, and six V-shaped ribs was measured using an Olsen flexural tester in a similar manner to the method described above.

Subsequently, the measured values were plotted on a graph, of which the horizontal axis represents the belt flexural rigidity and the vertical axis represents the drive torque, to make a linear approximation. An extrapolation value of the linear line at a point where the belt flexural rigidity is zero was assumed a loss torque caused not by the belt. This loss torque was subtracted from each of the measured values of the drive torque. The thus obtained values were converted to power, which was divided by the number of V-shaped ribs and was averaged to obtain a belt's drive force loss per belt width corresponding to a single V-shaped rib.

<Belt Running Test>

Figure 11:
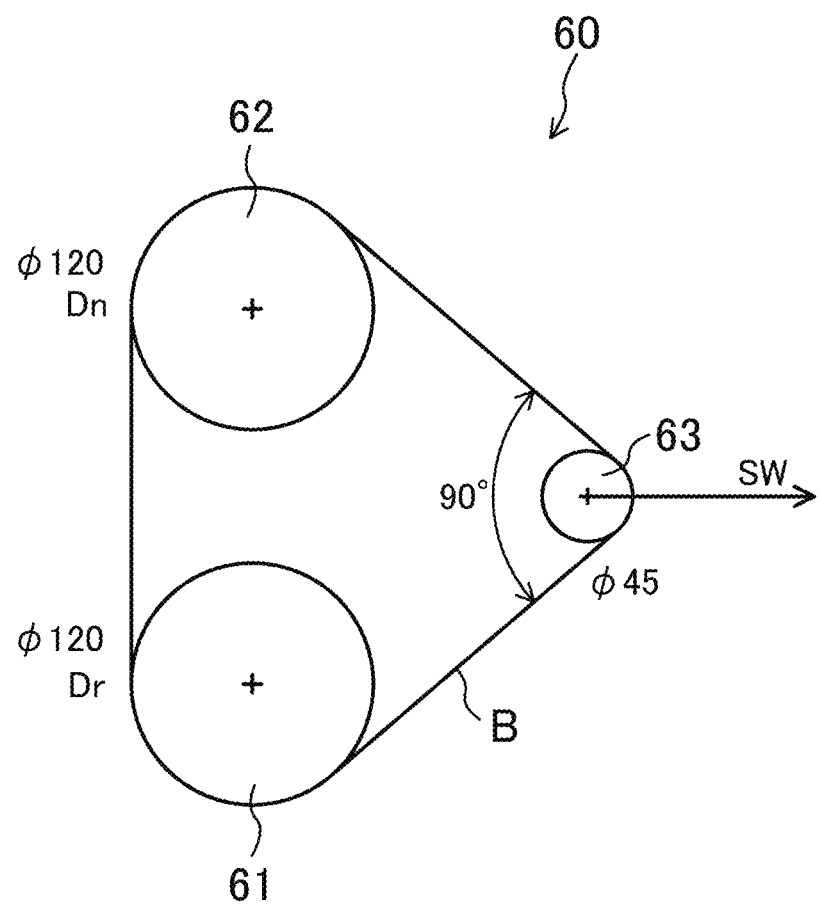
FIG. 11 illustrates a layout of pulleys of a belt running tester.

FIG. 11 illustrates a layout of pulleys of a belt running tester 60.

The belt running tester 60 includes a ribbed drive pulley 61 having a diameter of 120 mm, a first ribbed driven pulley 62 having a diameter of 120 mm and provided above the drive pulley 61, and a second ribbed driven pulley 63 having a diameter of 45 mm and provided at the right side of a midpoint between the pulleys 61 and 62 in the vertical direction. The second driven pulley 63 is positioned such that the belt wrap-around angle is 90°.

Each of the V-ribbed belts B of Examples 1 to 4 and Comparative Examples 1 to 5 was set on the belt running tester 60, and a set weight (SW) of 834 N was applied to the second driven pulley 63 toward the right side. In this state, at an ambient temperature of 23° C., the belt tension of the V-ribbed belt B was measured by a belt tension measurement device of a non-contact type. Subsequently, the drive pulley 61 was rotated at 4900 rpm to cause the belt to run for 150 hours. After that, the belt tension of the V-ribbed belt B was measured again. A belt tension maintenance factor was calculated from the belt tension before and after the belt running.

(Test Results)

The test results are shown in Tables 3 and 4.

TABLE 3

|  | Example | | | |
| --- | --- | --- | --- | --- |
|  | 1 | 2 | 3 | 4 |
| Belt Flexural Rigidity EI Per Belt Width Corresponding To Single V-Shaped Rib (N-m$^2$) | 0.051 | 0.063 | 0.065 | 0.075 |
| Belt Dry-Heat Shrinkage Force Per Belt Width Corresponding To Single V-Shaped Rib (N) | 45 | 44 | 47 | 51 |
| Belt's Drive Force Loss Per Belt Width Corresponding To Single V-Shaped Rib (W) | 1.53 | 2.29 | 2.91 | 3.82 |
| Belt Tension Maintenance Factor (%) | 52 | 58 | 57 | 62 |

TABLE 4

|  | Comparative Example | | | | |
| --- | --- | --- | --- | --- | --- |
|  | 1 | 2 | 3 | 4 | 5 |
| Belt Flexural Rigidity EI Per Belt Width Corresponding To Single V-Shaped Rib (N-m$^2$) | 0.088 | 0.098 | 0.083 | 0.075 | 0.066 |
| Belt Dry-Heat Shrinkage Force Per Belt Width Corresponding To Single V-Shaped Rib (N) | 56 | 53 | 43 | 38 | 35 |
| Belt's Drive Force Loss Per Belt Width Corresponding To Single V-Shaped Rib (W) | 5.76 | 6.38 | 5.05 | 4.29 | 3.22 |
| Belt Tension Maintenance Factor (%) | 66 | 62 | 51 | 46 | 44 |

Tables 3 and 4 show that the belt of each of Examples 1 to 4 has a thin cord made of polyester fibers with the total fiber fineness of the cord between 2200 dtex and 5500 dtex. In addition, the belt flexural rigidity is low. The drive force loss of the belts of Examples 1 to 4 is therefore small, which means that these belts are high efficiency belts. In addition, the belt dry-heat shrinkage force of Examples 1 to 4 is greater than or equal to 44 N, and the belt tension maintenance factor of these belts are high. This means that the belt tension of Examples 1 to 4 is kept from lowering.

Turning to Comparative Examples 1 and 2, the belt dry-heat shrinkage force is greater than or equal to 44 N, and the belt tension maintenance factor is high. Thus, the belt tension of Comparative Examples 1 and 2 is kept from lowering. However, each of the belts of Comparative Examples 1 and 2 has a thick cord with the total fiber fineness of 6600 dtex, and the belt flexural rigidity is high. This means that the drive force loss of these belts is great, and the belts are low efficiency belts. Turning to Comparative Example 3, although the belt has a thin cord with the total fiber fineness of 4400 dtex, the belt flexural rigidity is high, and the belt's drive force loss is great. Besides, the belt dry-heat shrinkage force is below 44 N, and the belt tension maintenance factor is also low. This means that the belt tension is greatly reduced. Turning to Comparative Example 4, although the belt has a thin cord with the total fiber fineness of 3300 dtex, the belt flexural rigidity is higher than that of the belt of Example 2 having the same total fiber fineness, and the belt's drive force loss is great. Besides, the belt dry-heat shrinkage force is below 44 N, and the belt tension maintenance factor is also low. This means that the belt tension is greatly reduced. Turning to Comparative Example 5, although the belt has a thin cord with the total fiber fineness of 2200 dtex, the belt flexural rigidity is higher than that of the belt of Example 1 having the same total fiber fineness, and the belt's drive force loss is greater than that of the belt of Example 1 having the same total fiber fineness. Besides, the belt dry-heat shrinkage force is below 44 N, and the belt tension maintenance factor is also low. This means that the belt tension is greatly reduced.

The present invention is useful in the technical field of a V-ribbed belt and a method for forming the V-ribbed belt.

The embodiment has been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiment described above is intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A V-ribbed belt comprising:
a V-ribbed belt body made of rubber and provided with a plurality of V-shaped ribs extending in a belt longitudinal direction and arranged parallel to one another in a belt width direction; and
a cord buried in the V-ribbed belt body such that the cord forms a helical pattern having a pitch in the belt width direction, wherein
the cord is made of a plied yarn with a total fiber fineness ranging from 2200 dtex to 5500 dtex, the plied yarn being formed by preparing a plurality of first-twist yarns, each obtained by twisting a bundle of polyester-based fibers in one direction, and secondly twisting the plurality of first-twist yarns in a direction opposite to a first-twist direction, a fiber fineness of the cord per belt width corresponding to the single V-shaped rib ranges from 10000 dtex to 19000 dtex, and a belt dry-heat shrinkage force per belt width corresponding to the single V-shaped rib is 44 N or more, the belt dry-heat shrinkage force being a load increase with respect to a belt length of 300 mm in 30 minutes after applying, in an atmosphere of 150° C., a load of 6N in the belt longitudinal direction and holding the belt.

2. The V-ribbed belt of claim 1, wherein the number of first-twist yarns of the plied yarn making the cord is two or more and five or less.

3. The V-ribbed belt of claim 1, wherein a fiber fineness of the first-twist yarn of the plied yarn making the cord is 1100 dtex.

4. The V-ribbed belt of claim 1, wherein the cord has an outer diameter of 0.50 mm or more and 1.00 mm or less.

5. The V-ribbed belt of claim 1, wherein the pitch of the cord in the belt width direction is 0.70 mm or more and 1.10 mm or less.

6. The V-ribbed belt of claim 1, wherein a distance between portions of the cord adjacent to each other in the belt width direction is 0.08 mm or more and 0.20 mm or less.

7. The V-ribbed belt of claim 1, wherein a belt flexural rigidity per belt width corresponding to the single V-shaped rib is 0.045 $N \cdot m^2$ or more and 0.080 $N \cdot m^2$ or less.

8. A method for forming the V-ribbed belt of claim 1, wherein the cord undergoes, during an adhesion treatment in which the cord is soaked in an adhesive agent and heated, a stretching and thermal fixation process in which the cord is stretched while tension is applied to the cord, and a degree of stretching in the stretching and thermal fixation process is greater than 6.0%.

9. The method of claim 8, wherein a dry-heat shrinkage force of the cord which has undergone the adhesion treatment and the stretching and thermal fixation process is 0.20 cN/dtex or more and 0.50 cN/dtex or less.

* * * * *